US 6,693,731 B1

(12) United States Patent
Ohnuma et al.

(10) Patent No.: US 6,693,731 B1
(45) Date of Patent: *Feb. 17, 2004

(54) IMAGE PROCESSING APPARATUS AND METHOD

(75) Inventors: Nobuo Ohnuma, Yokohama (JP); Takatoshi Ohta, Yokohama (JP); Yuji Akiyama, Yokohama (JP); Yoko Hirosugi, Fujisawa (JP); Takahiro Moro, Wako (JP); Masahiro Nagatani, Yokohama (JP); Kazuyoshi Sumiuchi, Machida (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/689,096

(22) Filed: Jul. 30, 1996

(30) Foreign Application Priority Data

Jul. 31, 1995 (JP) ............................................. 7-194992
Jul. 31, 1995 (JP) ............................................. 7-194998

(51) Int. Cl.$^7$ .............................. G03F 3/08; H04N 1/46
(52) U.S. Cl. ........................ 358/529; 358/518; 358/523
(58) Field of Search ................................. 358/529, 523, 358/515, 518, 448, 504, 519, 520, 525; 395/101, 109

(56) References Cited

U.S. PATENT DOCUMENTS

| 4,980,760 A | * | 12/1990 | Hiratsuka et al. | ............. 358/80 |
| 5,172,223 A | * | 12/1992 | Suzuki et al. | ................. 358/79 |
| 5,359,437 A | * | 10/1994 | Hibi | ........................... 358/529 |
| 5,386,305 A | * | 1/1995 | Usami | ........................ 358/518 |
| 5,406,393 A | * | 4/1995 | Ueno | ......................... 358/504 |
| 5,408,342 A | * | 4/1995 | Kumada et al. | ............ 358/518 |
| 5,422,729 A | * | 6/1995 | Yoshida | ..................... 358/400 |
| 5,539,539 A | * | 7/1996 | Fujimoto et al. | .......... 358/518 |
| 5,652,626 A | * | 7/1997 | Kawakami et al. | ........ 347/463 |
| 5,659,407 A | * | 8/1997 | Andresen et al. | ........... 358/530 |
| 5,696,611 A | * | 12/1997 | Nishimura et al. | ........ 358/518 |
| 5,850,298 A | * | 12/1998 | Narahara et al. | ........... 358/518 |
| 5,940,192 A | * | 8/1999 | Ichikawa et al. | ........... 358/530 |

* cited by examiner

Primary Examiner—Edward Coles
Assistant Examiner—Joseph R. Pokrzywa
(74) Attorney, Agent, or Firm—Fitzpatrick, Cella, Harper & Scinto

(57) ABSTRACT

An image processing apparatus having a first black generating unit for generating a black component from input image data of signals representative of a plurality of color components, a color correcting unit for correcting the colors of the signals representative of the plurality of color components and a signal representative of the black component and outputting the color corrected signals representative of the plurality of color components, and a second black generating unit for generating a signal representative of a black component from the color corrected signals.

4 Claims, 10 Drawing Sheets (a)　　　(b)

IMAGE PROCESSING APPARATUS AND METHOD

BACKGROUND OF THE INVENTION

1. Field of the Invention

The present invention relates to an image processing apparatus and method with color correction.

2. Related Background Art

A color image recording system is known which has a host terminal for transferring record data and a color ink jet recorder for receiving record data from the host terminal and recording an image on a recording sheet by applying ink of a plurality of colors.

In this system, the host terminal uses three primary colors of RGB in order to process image data interactively with a display, and the recorder uses four-colors of CMYK because it records an image by using four color inks of CMYK.

It is necessary for this system to perform a correction/conversion process of RGB values dependent on the display into CMYK values dependent on the recorder. This conversion process for all pixels of one page data may be performed after the one page data to be printed is generated by the recorder. Recently, a system has been developed to increase the process speed, in which the conversion process is performed relative to an object on a page while one page data is generated, and the converted object is placed on this page, the object including graphics such as lines and circles, texts, and images such as scanned images.

Such a system has been assumed to use a display. Therefore, although it is possible to form an object on a page in RGB three colors, it is often impossible to form an object in CMYK four colors used by a recorder.

In such a system, the correction/conversion process of RGB into CMYK is performed in the following manner. First, RGB values of color attributes of each object dependent on the display are corrected to RGB values dependent on the recorder. The latter values are used to form the object on one page, and after one page data is generated, they are converted for all pixels into CMYK values dependent on the recorder. A process performed for each object is called a first color correction process, and a process performed for all pixels of one page is called a second color correction process.

The second color correction process converts RGB values into CMYK values. Conventionally, input RGB signals to a second color correction process unit are converted once into CMY signals by luminance/density conversion means, and a background color removal/black correction process is performed by using the minimum value of CMY as K to obtain CMYK signals.

If RGB data sets are equal, it is generally an achromatic color. Therefore, it is desired that the recorder uses only one black color. However, recording with only one black color causes an insufficient density so that in many cases, an achromatic color is often recorded by a combination of CMYK four colors. In this case, a grey balance is required to have the same color density in the range from a low density to a high density. However, a grey balance is difficult to achieve by a conventional background color removal/black correction process because this process is performed by the color conversion processing unit by using as K the minimum value of CMY signals converted by the luminance/density conversion means.

If RGB data sets are equal, it is generally an achromatic color. Therefore, it is desired that the recorder uses only one black color. However, in the above system, values once subjected to the color correction process are passed to the color conversion process. Therefore, even if the RGB values supplied to the color correction process unit are equal, it cannot be judged in practice whether the values input to the color correction process unit are equal. Accordingly, if the process of replacing the color with only one black color is performed, there is a possibility that even a chromatic color is recorded with only one black color.

SUMMARY OF THE INVENTION

The invention has been made under the above circumstances and aims at forming a black color efficiently and with high quality.

According to one aspect of the present invention, there is provided an image processing apparatus comprising: first black generating means for generating a black component from input image data of signals representative of a plurality of color components; color correcting means for correcting the colors of the signals representative of the plurality of color components and a signal representative of the black component and outputting the color corrected signals representative of the plurality of color components; and second black generating means for generating a signal representative of a black component from the color corrected signals.

The invention also aims at performing color correction in accordance with whether input image data is achromatic or chromatic.

According to another aspect of the invention, there is provided an image processing apparatus comprising: input means for inputting image data of an image; judging means for judging whether the input image data is achromatic; and color correcting means for correcting the color of the input image data and outputting color corrected image data containing a plurality of color components, wherein the color correcting means makes the levels of the plurality of color components generally equal to each other if the judging means judges that the input image data is achromatic, and makes the levels of the plurality of color components different if the judging means judges that the input image data is chromatic.

The above and other objects and features of the present invention will become apparent from the following detailed description of the preferred embodiments when read in conjunction with the accompanying drawings.

DETAILED DESCRIPTION OF THE PREFERRED EMBODIMENTS

Figure 1:
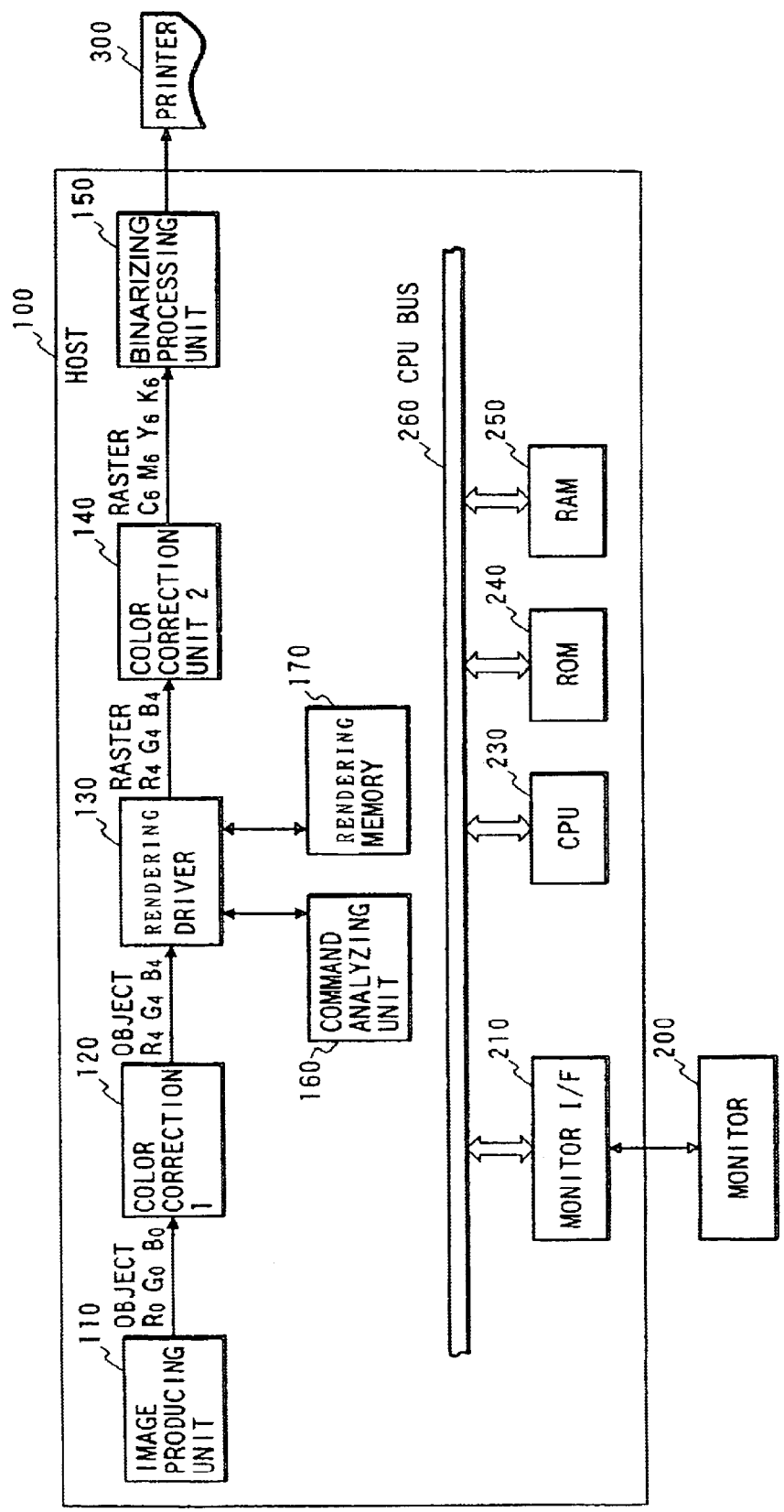
FIG. 1 is a block diagram showing an example of the structure of an image processing apparatus according to an embodiment of the invention.
Figure 5:
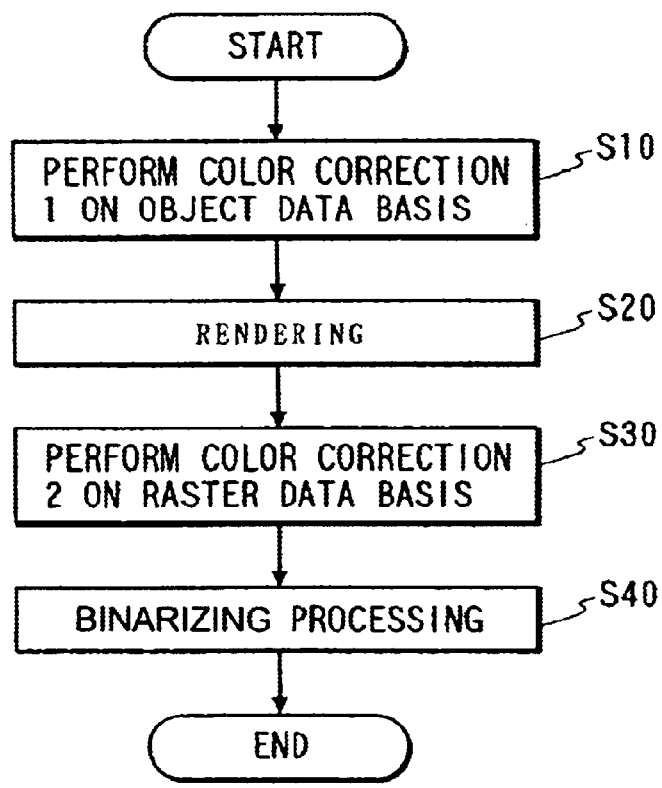
FIG. 5 is a flow diagram showing an example of the entire process.

FIG. 1 shows an example of the structure of an image processing system according to an embodiment of the invention. The image processing system includes a host 100, a monitor 200, and a printer 300. FIG. 5 is a flow chart illustrating the entire operation of the system.

Figure 4A:
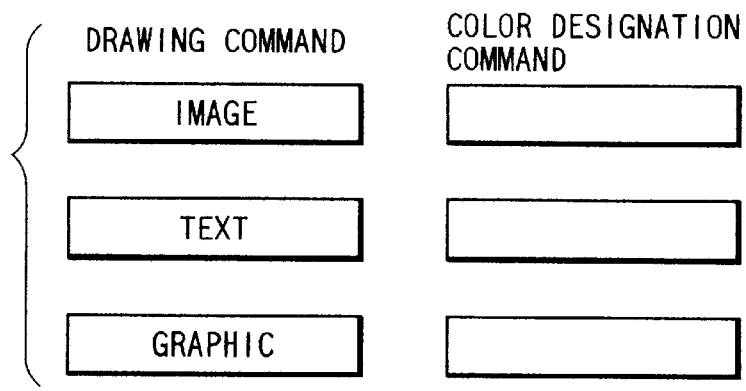
FIGS. 4A and 4B are diagrams illustrating examples of object image data.
Figure 4B:
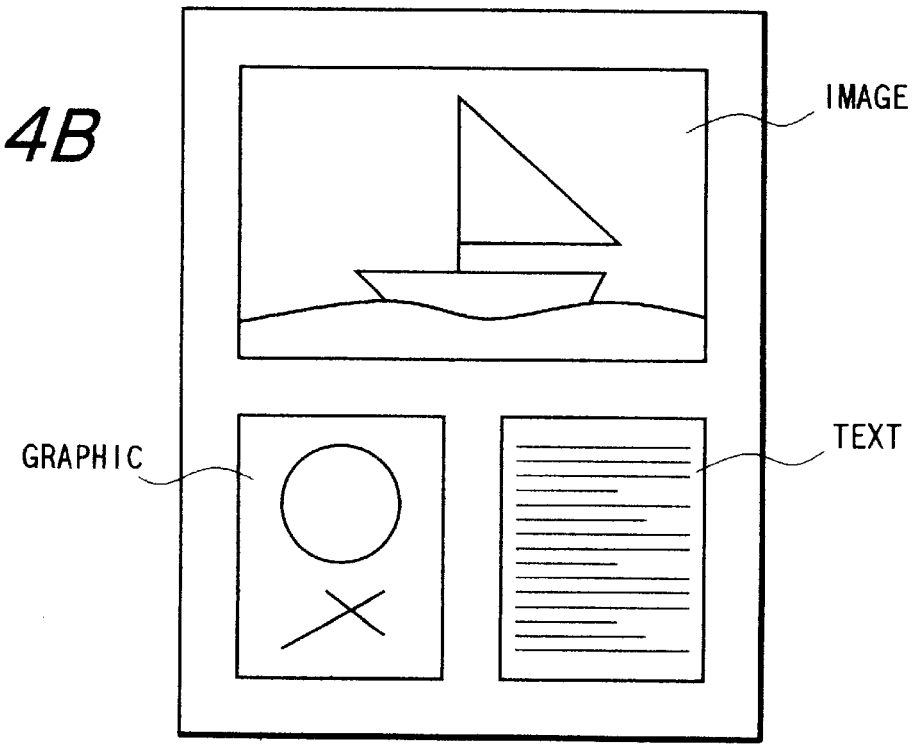

An image generating unit 110 generates data of a plurality of object images constituting an image of one page, by using application software running on the host. The generated data of each object image is constituted, as shown in FIGS. 4A and 4B, by a drawing command and a color designating command for designating the color of each object by $R_0 G_0 B_0$ colors each having 8 bits.

The data of object images include, for example, images (natural images), text, and graphics.

The data of an object image representing an image is constituted by a drawing command designating an image and a plurality of $R_0 G_0 B_0$ data sets representing pixels of the image.

The data of an object image representing text is constituted by a drawing command designating text and a plurality of $R_0 G_0 B_0$ data sets representing the type and color of each character.

The data of an object image representing graphics is constituted by a drawing command designating a type of graphics (e.g., circle, line, etc.) and a plurality of $R_0 G_0 B_0$ data sets representing the color of the graphics.

The $R_0 G_0 B_0$ data of the color designating command is generated while viewing the monitor in accordance with the application software, so that the data has the characteristics dependent upon the monitor characteristics.

A first color correction unit 120 performs a color correction process for the $R_0 G_0 B_0$ data dependent upon the monitor characteristics, and corrects and converts the data into $R_4 G_4 B_4$ data dependent upon the characteristics of the printer 300 (S10).

A rendering driver 130 analyzes the object image data of each object by using a command analyzing unit 160, the object image data being constituted by the drawing command and color designating command ($R_4 G_4 B_4$ data) for designating color. Then, the rendering driver 130 develops the object image data on a rendering memory 170, and generates $R_4 G_4 B_4$ data of a raster format (S20).

With this rendering process, an object represented by the $R_4 G_4 B_4$ data dependent upon the printer characteristics is formed on a page at a predetermined position. By forming all objects on one page, image data of a raster format of one page can be generated. A second color correcting unit 140 corrects the color of each of all pixels of one page.

The second color correcting unit 140 corrects the color of each pixel of the $R_4 G_4 B_4$ data of a raster format to generate $C_6 M_6 Y_6 K_6$ data of a raster format (S30).

A binarization processing unit 150 performs a binarization process such as a dither process and an error diffusion process relative to the $C_6 M_6 Y_6 K_6$ data of a raster format, and outputs binary data to the printer 300 (S40).

Each unit described above is controlled by a CPU 230 via a CPU bus 260. CPU 230 controls each unit in accordance with a program stored in a ROM 240 and by using a RAM 250 as a working memory.

A monitor I/F 210 connected to the monitor 200 is connected to the CPU bus 260.

In accordance with the data of each one bit of CMYK data output from the binarization processing unit 150, the printer 300 forms an image with a recording head of the type jetting out a droplet boiled by a heated film.

Figure 2:
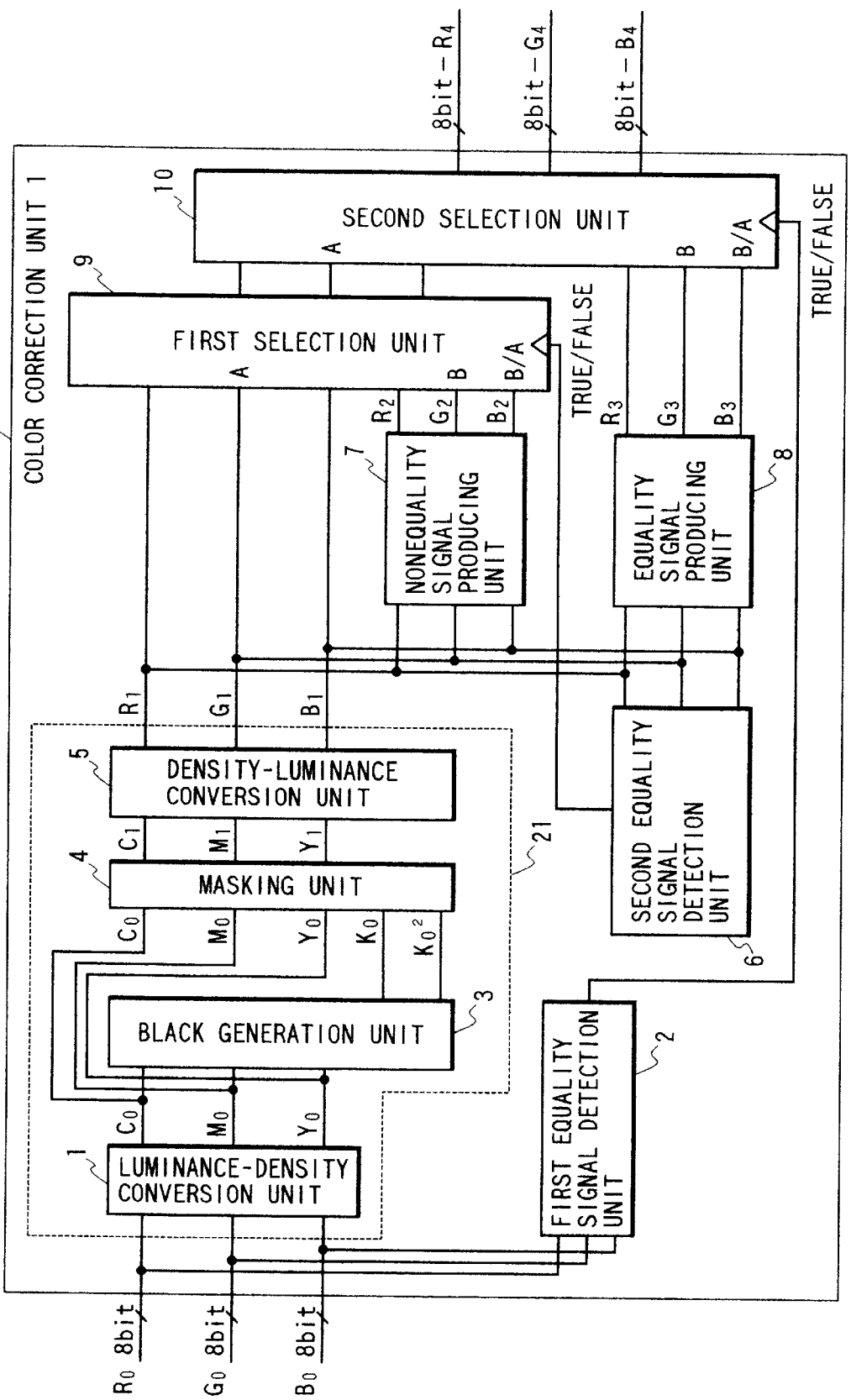
FIG. 2 is a block diagram showing an example of the structure of a first color correction unit.

FIG. 2 is a block diagram showing an example of the structure of the first color correcting unit 120. As described earlier, the first color correcting unit 120 converts the $R_0 G_0 B_0$ data dependent upon the monitor characteristics and contained in the object image data, into the $R_4 G_4 B_4$ data dependent upon the printer characteristics.

The first color correcting unit 120 is constituted by a color correcting means 21, a first equal signal detecting means 2, a second equal signal detecting means 6, a different signal generating means 7, an equal signal generating means 8, a first selecting means 9, and a second selecting means 10. The color correcting means 21 is constituted by a luminance/density converting means 1, a black generating means 3, a masking means 4, and a luminance/density converting means 5.

The input signals $R_0 G_0 B_0$ each having 8 bits of the color designating command for designating the color of each object are input to the first equal signal detecting means 2 and the luminance/density converting means 1 constituting the color correcting means 21.

The first equal signal detecting means 2 checks whether the $R_0 G_0 B_0$ data sets are equal, i.e., whether $R_0 = G_0 = B_0$, and if equal, a true logical value is output, and if not equal, a false logical value is output, respectively, to the second selecting means 10.

The luminance/density converting means 1 performs a luminance/brightness conversion process by using the following equation, where an input signal is $X_0$ (X=R, G, B) and an output signal is $Z_0$ (Y=C, M, Y).

$$Z_0 = A \times 1/\log(X_0)$$

where A is a constant.

With this luminance/density conversion process, a distortion of the $R_0 G_0 B_0$ data caused by the monitor characteristics is corrected.

The $C_0 M_0 Y_0$ data output from the luminance/density converting means 1 is input to the first black generating means 3 which generates the $K_0$ data and $K_0^2$ data of achromatic components and outputs it to the masking means 4.

The $C_0 M_0 Y_0$ data output from the luminance/density converting means 1 as well as the $K_0$ data and $K_0^2$ data output from the black generating means 3 is output to the masking means 4.

Figure 7:
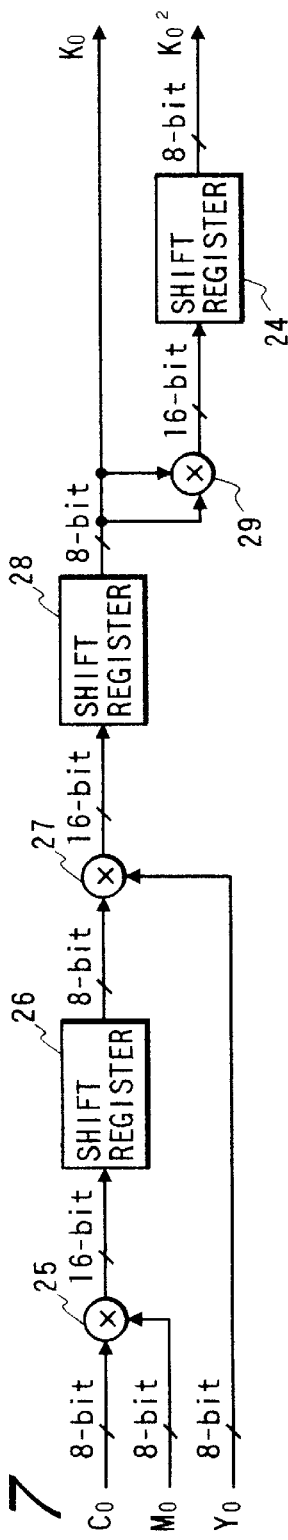
FIG. 7 is a block diagram showing an example of the structure of a black generating means.

FIG. 7 is a block diagram showing the structure of the black generating means 3.

In FIG. 7, reference numerals 25, 27, and 29 represent a multiplier which multiplies two inputs (each 8-bits) and outputs the results (16-bits). Reference numerals 26, 28, and 24 represent a shift register which shifts an output of the multiplier by 8 bits to the right to convert the 16-bit data into 8-bit data. With these processes, $K_0$ and $K_0^2$ data can be obtained from the following equations.

$$K_0 = (C_0 \times M_0 \times Y_0)/(256 \times 256)$$

$$K_0^2 = (K_0 \times K_0) \times 256$$

As above, the data $K_0$ and $K_0^2$ can be obtained through a product of $C_1$, $M_1$, and $Y_1$.

The data $K_0$ and $K_0^2$ of achromatic components can be obtained through the product and a good grey balance can be maintained.

The $C_0 M_0 Y_0$ data output from the luminance/density converting means 1 as well as the data $K_0$ and $K_0^2$ output from the black generating means 3 is input to the masking means 4 which converts the input data into $C_1 M_1 Y_1$ data through a color correction based upon the printer output characteristics.

A relationship between $C_0$, $M_0$, $Y_0$, $K_0$, $K_0^2$ and $C_1$, $M_1$, $Y_1$ is defined by the following equations.

$$C_1 = a_{00} \times C_0 + a_{01} \times M_0 + a_{02} \times Y_0 + a_{03} \times K_0 + a_{04} \times K_0^2$$

$$M_1 = a_{10} \times C_0 + a_{11} \times M_0 + a_{12} \times Y_0 + a_{13} \times K_0 + a_{14} \times K_0^2$$

$$Y_1 = a_{20} \times C_0 + a_{21} \times M_0 + a_{22} \times Y_0 + a_{23} \times K_0 + a_{24} \times K_0^2$$

where $a_{ij}$ is a constant satisfying the conditions of $0 \leq i \leq 2$ and $0 \leq j \leq 4$. As seen from the above equations, the color converted data $C_1 M_1 Y_1$ has the color corrected values containing $K_0$ and $K_0^2$, and the data $K_0$ and $K_0^2$ has the value obtained through a product of $C_0 M_0 Y_0$.

The masked $C_1 M_1 Y_1$ data is input to the density/luminance converting means 5, and again converted into luminance signals ($R_1 G_1 B_1$ data).

The $R_1 G_1 B_1$ data as the luminance signals is input to the second equal signal detecting means 6, different signal generating means 7, and equal signal generating means 8. The second equal signal detecting means 6 checks whether the $R_1 G_1 B_1$ data sets are equal, i.e., whether $R_1 = G_1 = B_1$, and if equal, a true logical value is output, and if not equal, a false logical value is output, respectively to the first selecting means 9. If the output of the second equal signal detecting means 6 ia a true logical value, the first selecting means 9 selects and outputs the $R_2 G_2 B_2$ data generated by the different signal generating means 7 because there is a possibility that the $R_0 G_0 B_0$ data sets, although they are not equal, were converted into equal signals by the color correcting means 21. If the output of the second equal signal detecting means 6 is a false logical value, the $R_1 G_1 B_1$ data processed by the color correcting means 21 is selected and output.

An output of the first selecting means 9 is input to the second selecting means. If the output of the first equal signal detecting means 2 is a false logical value, the output of the first selecting means 9 is selected and output. If the output of the first equal signal detecting means 2 is a true logical value, it means achromatic data is input to the color correcting means 21 so that an output of the equal signal generating means is selected and output.

The $R_1 G_1 B_1$ data is input to the different signal generating means 7 which in turn outputs the $R_2 G_2 B_2$ data. A following relationship is established between the $R_1 G_1 B_1$ data and the $R_2 G_2 B_2$ data.

$$R_2 = R_1$$

$$G_2 = G_1$$

$$B_2 = B_1 - 1$$

The $R_1 G_1 B_1$ data is input to the equal signal generating means 8 which in turn outputs the $R_3 G_3 B_3$ data. A following relationship is established between the $R_1 G_1 B_1$ data and the $R_3 G_3 B_3$ data.

$$R_3 = G_3 = B_3 = (R_1 + G_1 + B_1)/3$$

With the processes by the different signal generating means 7 and equal signal generating means 8, equal and different signals can be generated while retaining the color correction results by the color correcting means 21 as much as possible.

With the arrangement described above, the $R_0 G_0 B_0$ data dependent upon the monitor characteristics can be color corrected to the $R_4 G_4 B_4$ data dependent upon the printer characteristics.

Further, only when the $R_0 G_0 B_0$ object image data sets are equal (achromatic), the $R_4 G_4 B_4$ data sets of a raster format are subjected to a color correction to make them equal.

Figure 3:
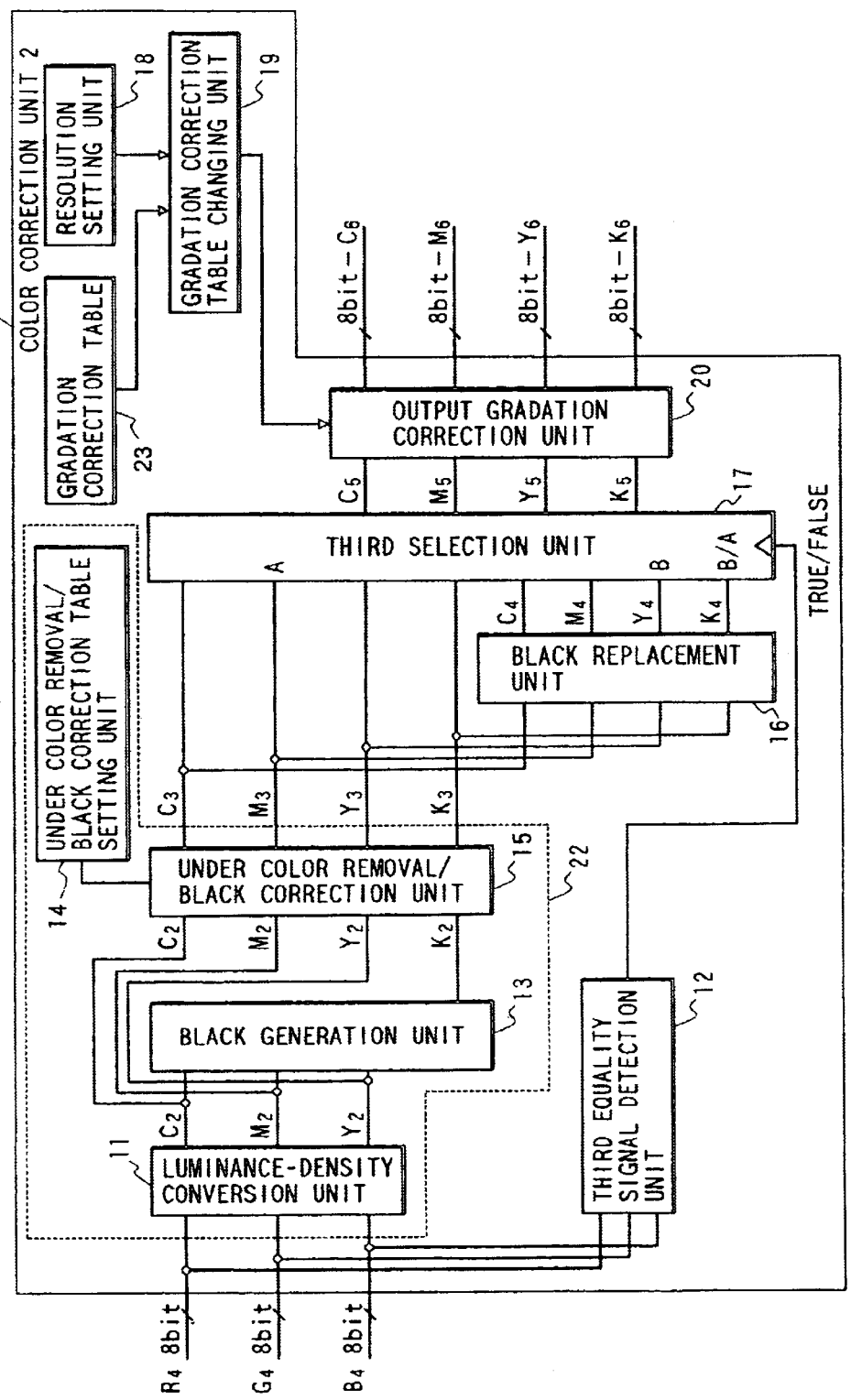
FIG. 3 is a block diagram showing an example of the structure of a second color correction unit.

FIG. 3 is a block diagram showing an example of the structure of the second color correcting unit 140.

The second color correcting unit 140 is constituted by a color correcting means 22, a third equal signal detecting means 12, a black replacing means 16, a third selecting means 17, and an output gradation correcting means 20. The color correcting means 22 is constituted by a luminance/density converting means 11, a black generating means 13, and a background color/black correcting means 15.

The $R_4 G_4 B_4$ data each having 8 bits of the pixel data of one page generated by the rendering process is input to the third equal signal detecting means 12 and the luminance/density converting means 11 constituting the color correcting means 22.

The third equal signal detecting means 12 checks whether the $R_4 G_4 B_4$ data sets are equal, i.e., whether $R_4 = G_4 = B_4$, and if equal, a true logical value is output, and if not equal, a false logical value is output, respectively to the third selecting means 17.

The luminance/density converting means 11 again converts the luminance signal output from the density/luminance converting means 5 into density signals.

The $C_2 M_2 Y_2$ data output from the luminance/density converting means 11 is input to the black generating means 13 which generates $K_2$ data representative of the achromatic components by using the following equation.

$$K_2 = \min(C, M, Y)$$

where min (C, M, Y) is a function for selecting a minimum value among C, M, and Y.

By generating $K_2$ from the minimum value among C, M, and Y, a good color balance can be maintained.

The $K_2$ data representative of the achromatic components generated by the black generating means 13 as well as the $C_2 M_2 Y_2$ data generated by the luminance/density converting means 11 is input to the background color removal/black correcting means 15.

The background color removal/black correcting means 15 refers to look-up tables set by a background color removal/black correcting table setting means 14, and performs a background color removal process and a black correcting (black generating) process to generate $C_3 M_3 Y_3 K_3$ data. A relationship between the $C_2 M_2 Y_2 K_2$ data and the $C_3 M_3 Y_3 K_3$ data is given in the following.

$$C_3 = C_2 - \text{Table}_{UCRC}(K_2)$$

$$M_3 = M_2 - \text{Table}_{UCRM}(K_2)$$

$$Y_3 = Y_2 - \text{Table}_{UCRY}(K_2)$$

$$K_3 = \text{Table}_{BGR}(K_2)$$

where $\text{Table}_{UCRC}$, $\text{Table}_{UCRM}$, and $\text{Table}_{UCRY}$ indicate a reference to background color removal tables set by the background color removal/black correcting table setting means 14, and $\text{Table}_{BGR}$ indicates a reference to a black correcting table set by the table setting means 14.

Figure 6:
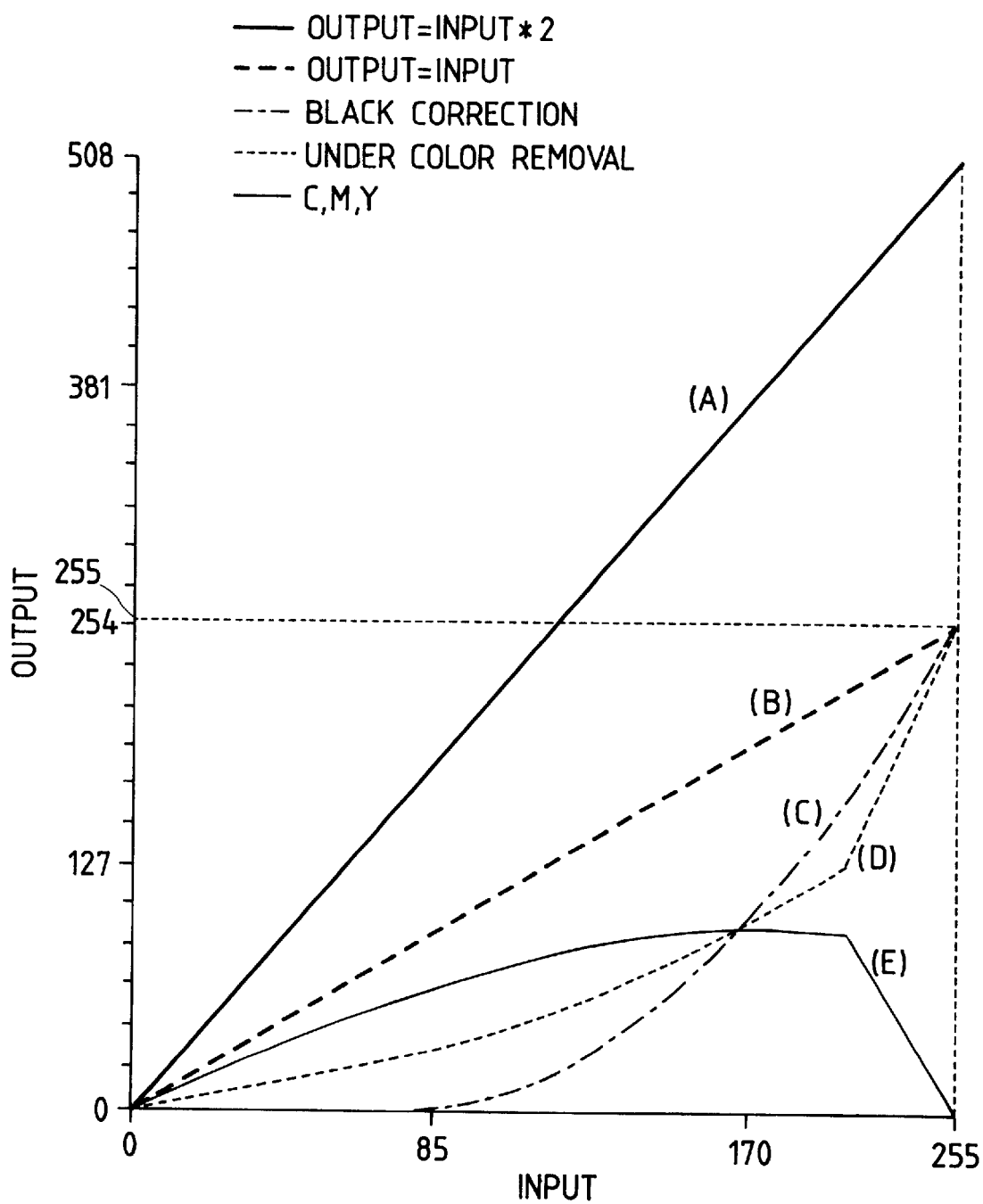
FIG. 6 is a graph showing examples of black correction/background color removal curves.

Curves set in the black correcting and background color removal tables are shown in FIG. 6. A black correcting curve takes a 0 value up to one third of an input maximum value (255) and gently rises in the form of a quadratic curve over one third. Since K is not used in the low density area, color at the low density area such as flesh tint can be generated with good reproductivity.

The black correcting curve takes a maximum output value of 255 at the maximum input value, and also a background color removal curve takes a maximum output value at the maximum input value. Therefore, if $C_2 = M_2 = Y_2 = 255$, $K_2$ is 255 and only one color of K is used for recording. In this manner, other colors are not mixed to the 100% K color area.

A curve E shown in FIG. 6 is a curve indicating the input value subtracted by the background color removal value. Even if this curve is multiplied by three (for three colors of C, M, and Y) and added to the black correcting curve, the resultant curve will not exceed the line of output=input×2.

Since K is not used in order to improve color reproductivity at the low density area, a dose at the low density area exceeds a maximum dose. Therefore, in this embodiment, the background color removal is performed at the low density area to make the dose smaller than the maximum dose. Still further, the background color removal is performed by using a function having no discontinuous point in the low density area so that the continuity can be retained.

According to the background color removal and black correction of this embodiment, at each input value for achromatic color, the total output value of C, M, Y, and K is restricted to twice or smaller than the input value. Therefore, the gradation of achromatic color can be reproduced over the entire area. Still further, both for achromatic color and chromatic color, a dose can be restricted to a maximum dose (in this case, 200%) set by the recording medium characteristics, or smaller.

The color converted $C_3 M_3 Y_3 K_3$ data is input to the black replacing means 16 and third selecting means 17.

The $C_3 M_3 Y_3 K_3$ data is input to the black replacing means 16 which in turn outputs $C_4 M_4 Y_4 K_4$ data replaced by only black color. A following relationship is established between the $C_3 M_3 Y_3 K_3$ data and $C_4 M_4 Y_4 K_4$ data.

$$C_4 = M_4 = Y_4 = 0$$

$$K_4 = K_3 + \alpha \times C_3 + \beta \times M_4 + \gamma \times Y_4$$

where $\alpha$, $\beta$, and $\gamma$ are each constants.

In accordance with the detection results of the third equal signal detecting means 12, the third selecting means 17 selects and outputs an input from one of the background color removal/black correcting means 15 and the black replacing means 16. Specifically, if the output of the third equal signal detecting means 12 is a true logical value, it means an input of achromatic color so that an input from the black replacing means 16 is selected, whereas if a false logical value, an input from the background color removal/ black correcting means 15 is selected. The selected data is output as $C_5 M_5 Y_5 K_5$ data.

In the above manner, only if the $R_4 G_4 B_4$ data sets are equal ($R_4 = G_4 = B_4$), the color correction becomes possible to make the $C_5 M_5 Y_5 K_5$ data sets equal ($C_5 = M_5 = Y_5 = 0$, $K_5 = K_4$).

The $C_5 M_5 Y_5 K_5$ data output from the third selecting means 17 is input to the gradation correcting means 10 for a gradation correction process to output $C_6 M_6 Y_6 K_6$ data.

Reference numeral 18 represents a resolution setting means for setting a resolution suitable for the printer.

Reference numeral 23 represents a gradation correcting table which stores the gradation characteristics used for a low resolution recording by the printer. This table is read by an output gradation correction characteristics changing means 19, and the changed value is supplied to an output gradation correcting means 20.

The output gradation correction characteristics changing means 19 reads the gradation correcting table 23, changes the read value in accordance with a resolution set by the resolution setting means 18, and supplies it to the output gradation correcting means 20.

Figure 10:
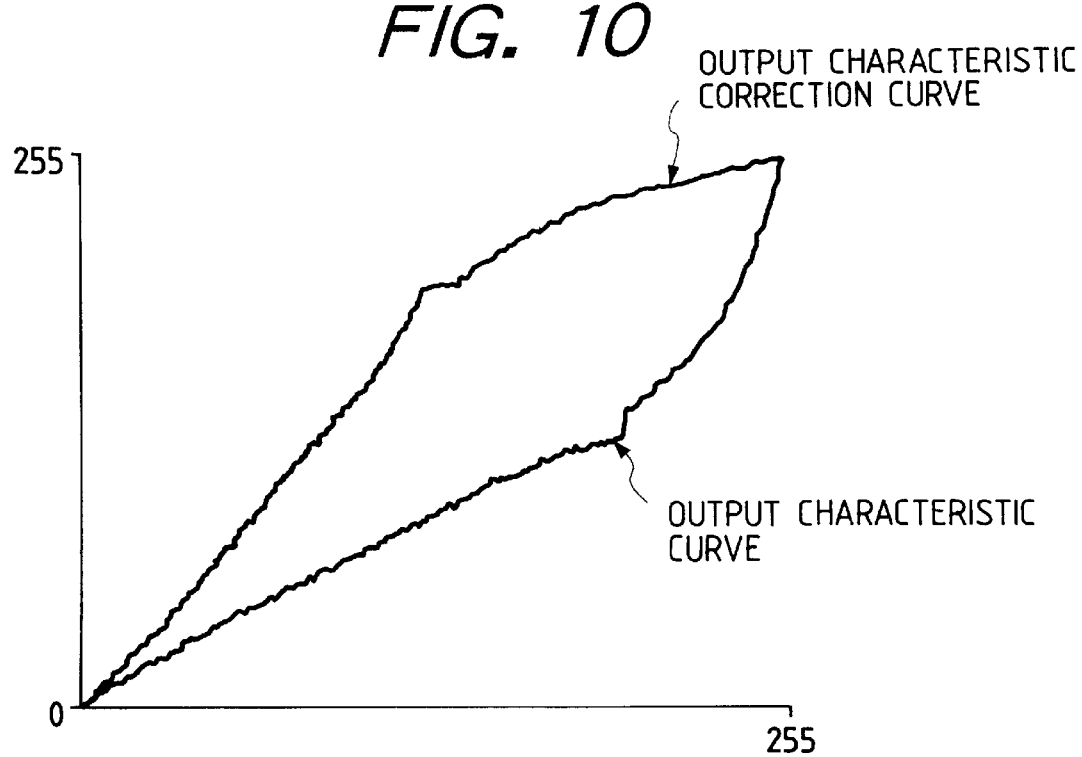
FIG. 10 is a graph illustrating an example of a process by an output gradation compression unit.
Figure 11:
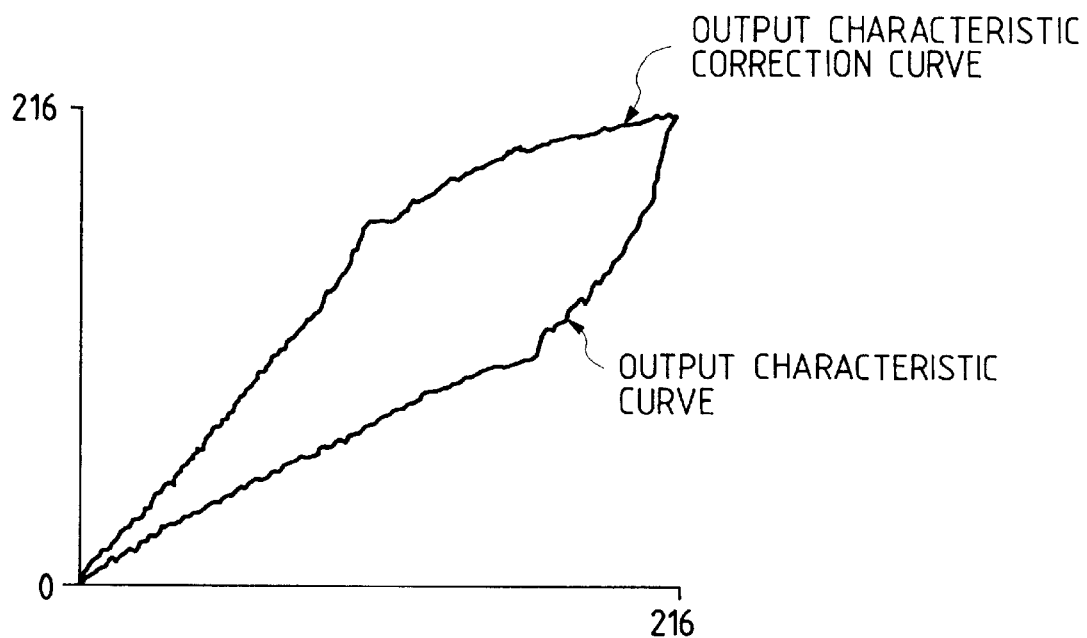
FIG. 11 is a graph illustrating an example of a process by an output gradation compression unit.

FIGS. 10 and 11 are graphs illustrating the operation of the output gradation correction characteristics changing means for changing the gradation correction characteristics of the printer. FIG. 10 shows an output characteristic curve and an output characteristics correcting curve set when a low resolution is set by the resolution setting means 18, and FIG. 11 shows an output characteristic curve and an output characteristics correcting curve set when a high resolution is set by the resolution setting means 18.

Figure 12:
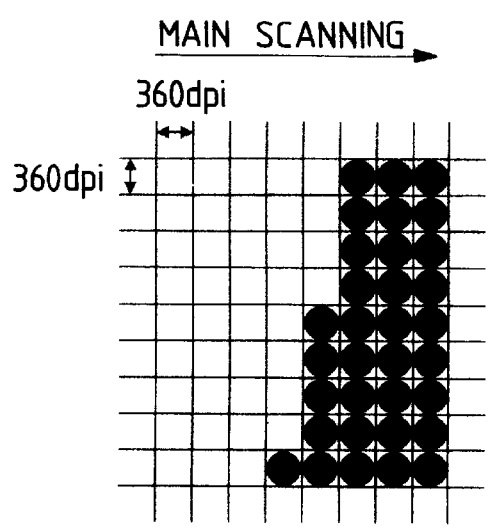
FIG. 12 is a graph showing an example of high resolution recording.
Figure 13:
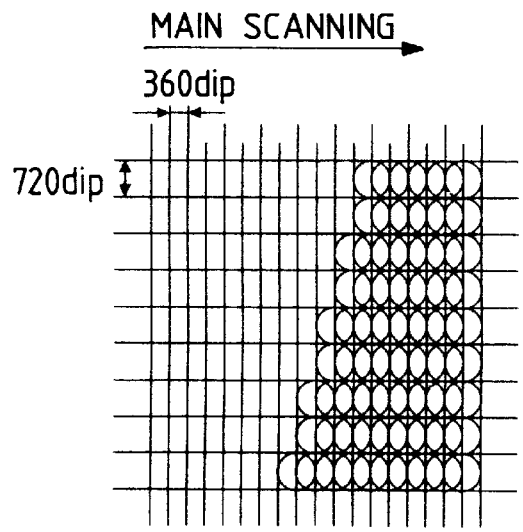
FIG. 13 is a graph showing an example of low resolution recording.

With reference to FIGS. 12 and 13, the method of recording an image at a high or low resolution by using the printer 300 will be described.

The printer 300 of this embodiment prints an image by a serial recording method in which a recording head with a plurality of nozzles disposed in the sub scan direction is moved in the main scan direction to print an image, after one line is recorded, the recording medium is moved in the sub scan direction and the recording head is moved to the record start position to record the next line, and by repeating the above operations, one page is printed.

With such a recording apparatus, a resolution in the main scan direction can be doubled without changing a dot diameter of the recording head, by moving the recording head in the main scan direction by a half of the normal pitch.

With a recording apparatus having a resolution of 360 dot per inch (dpi)×360 dpi in the vertical and horizontal directions, an image is recorded as shown in FIG. 12. If the recording head is moved in the main scan direction (in the horizontal direction) by a half of the normal pitch, an image is recorded as shown in FIG. 13. However, since the size of an ink droplet jetted out of the recording head is designed based upon the original resolution, a twofold amount of ink is applied to the recording medium, resulting in too much ink, which flows in some cases.

In order to print an image at a high resolution, the $C_5 M_5 Y_5 K_5$ data having 0 to 255 levels is compressed to 0 to 216 levels so as to limit the ink amount.

Figure 8:
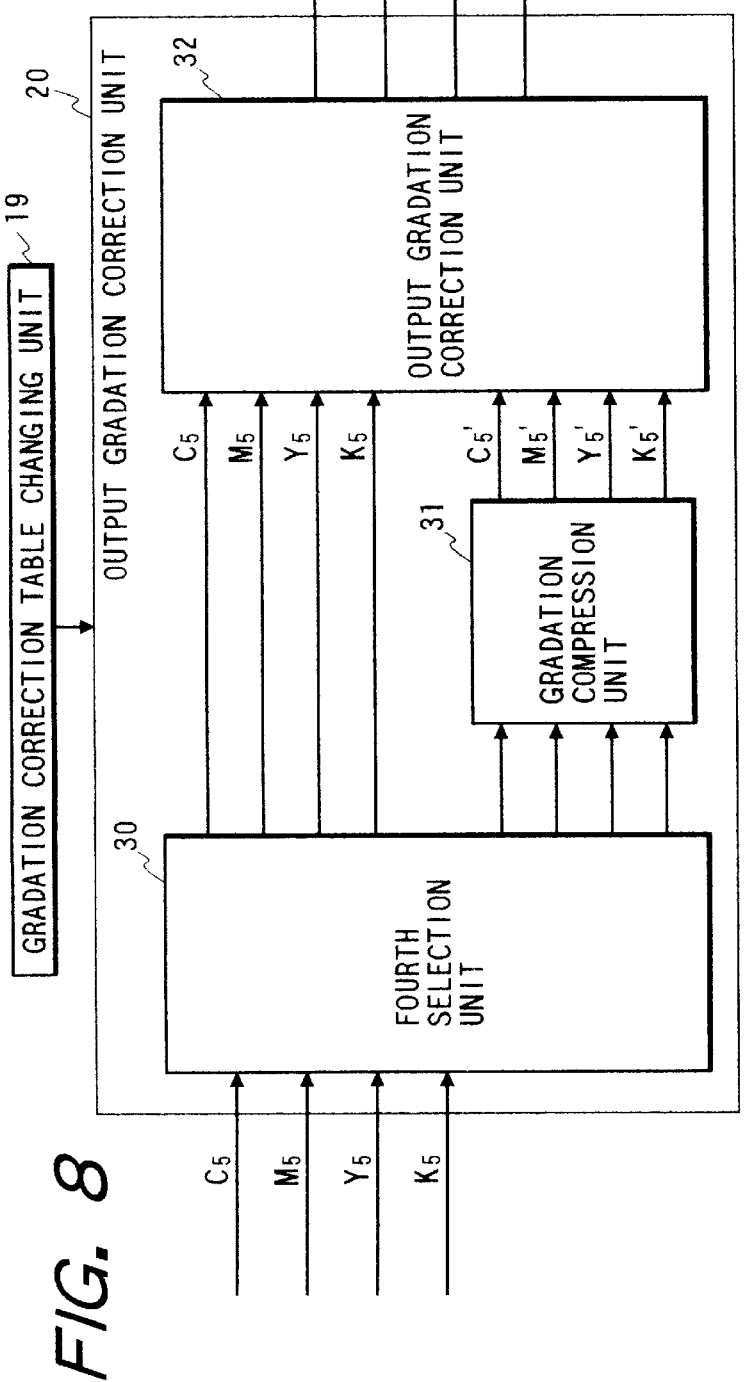
FIG. 8 is a block diagram showing an example of the structure of an output gradation correcting means.

The structure of the output gradation correcting means 20 will be described with reference to FIG. 8.

A fourth selecting unit 30 and an output gradation correcting unit 32 are both controlled in common by a control signal from the gradation correcting table.

Figure 9:
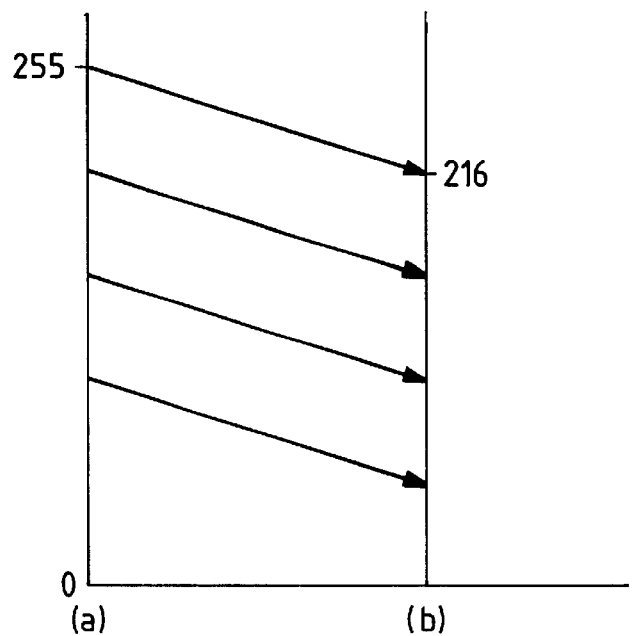
FIG. 9 is a graph illustrating an example of a process by a gradation compression unit.

The fourth selecting unit 30 selects the $C_5 M_5 Y_5 K_5$ data and outputs it to a gradation compressing unit 31 in response to a control signal from the gradation correction table changing means 19, if the resolution setting means 18 sets a high resolution recording. The gradation compressing unit 31 compresses the $C_5M_5Y_5K_5$ data having 0 to 255 levels in order to limit the ink amount for the high resolution recording, into 0 to 216 levels at (b) in FIG. 9 in accordance with the input level of each signal component of the $C_5M_5Y_5K_5$ data having 0 to 255 levels at (a) in FIG. 9. The compressed data is output to the output gradation correcting unit 32.

By compressing the data in accordance with its input level, the gradation can be retained as much as possible.

If the resolution setting means 18 sets a low resolution recording, the fourth selecting unit 30 selects the $C_5M_5Y_5K_5$ data and outputs it to the output gradation correcting unit 32.

In accordance with the low resolution recording set by the resolution setting means 18, the output gradation correcting unit 32 refers to the gradation correcting table changed by the gradation correction table changing means 19, and performs the following output gradation correction process.

$$C_6 = \text{Table}\gamma_C (C_5 \text{ or } C_5')$$

$$M_6 = \text{Table}\gamma_M (M_5 \text{ or } M_5')$$

$$Y_6 = \text{Table}\gamma_Y (Y_5 \text{ or } Y_5')$$

$$K_6 = \text{Table}\gamma_K (K_5 \text{ or } K_5')$$

where $\text{Table}\gamma_C$, $\text{Table}\gamma_M$, $\text{Table}\gamma_Y$, and $\text{Table}\gamma_K$ indicate a reference to gradation correcting tables for respective colors.

As seen from FIG. 10, when the low resolution recording is set, the output gradation correcting unit 32 sets an output correction curve so that the output value (in this embodiment, the mapped density values from 0 to 255) becomes linear relative to the entire input value range from 0 to 255. Specifically, the output correction curve is set based upon a distortion contained in the output characteristics of the printer 300.

As shown in FIG. 11, when the high resolution recording is set, the output gradation correcting unit 32 sets an output correction curve so that the output value becomes linear relative to part (from 0 to 216) of the entire input value range from 0 to 255. This setting results from the following reason. Even if the resolution is changed, if the same recording medium is used, its output characteristics don't change. Therefore, even if the dose increases for the input of 217 level or higher in correspondence with a narrowed input range, i.e., in correspondence with a rise of the resolution, the density cannot be raised further. Therefore, the maximum ink amount per unit area does not change in the output characteristics curve shown in FIG. 11, and this curve has a shape reduced by the same reduction factor in both input and output levels of the output characteristics curve shown in FIG. 10.

For the high resolution recording, the range per one pixel is limited to 216 levels. However, the maximum ink amount per unit area on a recording medium is the same as the low resolution recording.

Even at the high resolution recording, the maximum density can be retained. The contrast of the total image is rather emphasized in the case of the high resolution recording because of high recording density.

In the low resolution recording, a half-tone area can be reproduced with high fidelity because 0 to 255 levels are used as shown in FIG. 10.

As above, the gradation correction process can be performed in accordance with a set resolution recording.

The output gradation correction characteristics means 19 does not change the gradation correcting table which stores the output correction curve of the low resolution recording, if the resolution setting means 18 sets the low resolution recording, whereas if the high resolution recording is set, it sets the gradation correcting table which stores the characteristics of the output correction curve reduced by the same reduction factor both in input and output levels.

Therefore, even in a system whose output gradation correction characteristics change with the set resolution, the system is not required to have a large amount of output gradation correcting data.

In the above embodiment described above, the second color correcting unit performs the background color removal/black correcting process by using the minimum value of CMY as K, and the first color correcting unit obtains K from a product of CMY prior to calculating the CMYK data which is corrected by using the K value. Therefore, a good grey balance can be realized for the CMYK data output from the second color correcting unit.

Further, since each of the first and second color correcting units generates black color for color correction, black color can be formed efficiently and with high quality.

In the above embodiment, even in the structure wherein the first and second color correcting units separately perform the color process, the printer can record with only one black color only in the case wherein the input signal is achromatic.

The background color removal/black correcting means 15 reproduces hue with high fidelity because K is not used in the low density area, and can record a high density area because K is used.

If the densities of all C, M, and Y are maximum, an image can be recorded only by one K color.

An image can be recorded by suppressing the ink dose lower than the maximum dose for any of the input signals.

In this embodiment, an object image data is analyzed, the first color correcting unit is provided before the rendering driver for color development, the luminance/density converting means 1 corrects a distortion caused by the monitor characteristics, and the masking means 4 corrects the data and converts it into color signals matching the printer characteristics. Accordingly, image signals can be processed efficiently and at high speed, as compared to the case wherein the image signals after development are color corrected for each pixel.

Figure 14:
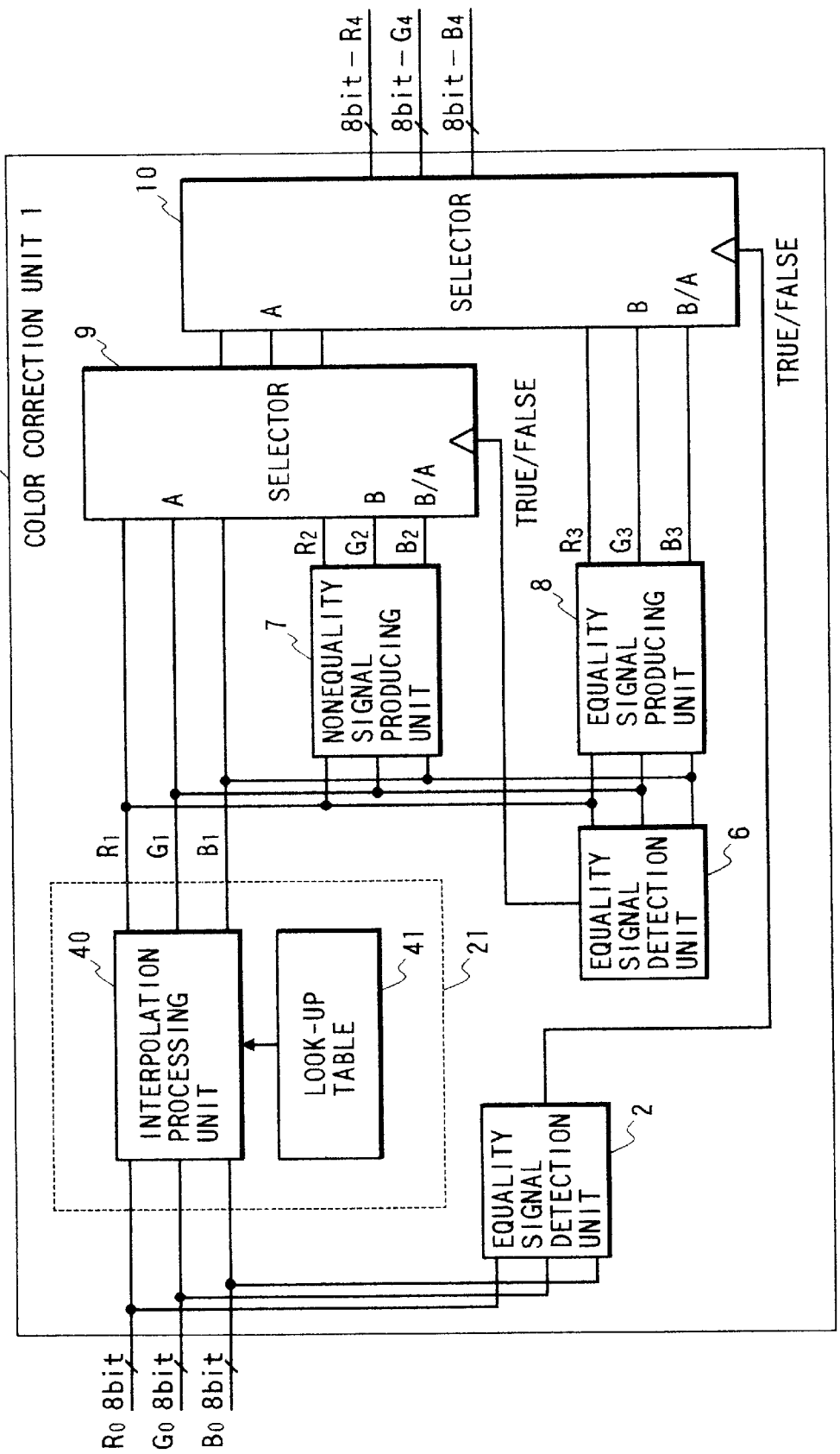
FIG. 14 is a block diagram showing an example of the structure of the first color correction unit according to a modification of the embodiment.

FIG. 14 is a block diagram showing a modification of the above embodiment.

Like elements to those of the above embodiment are represented by using identical reference numerals and the description thereof is omitted.

In this modification, in place of the color correcting means 21 constituted by the luminance/density converting means 1, black generating means 3, masking means 4, and density/luminance converting means 5, the color correcting means of this modification is constituted by an interpolation processing means 40 and a look-up table 41. In this modification, the color correction process is performed by an interpolation calculation with reference to the look-up table 41 which stores at each matrix point the data for image signals obtained in advance after performing a luminance/density conversion process, a black generation process, a masking process, a density/luminance conversion process, and the like. With this arrangement, a plurality of color correction processes can be replaced by one interpolation process.

In the above embodiment, a digital image signal of 8 bits is used. A digital image signal of 12 bits, 16 bits, . . . , N bits may also be used.

The recording apparatus is not only limited to a color ink jet recording apparatus, but other recording apparatus such as thermal transfer type recording apparatus and electrophotograhic recording apparatus may also be used if they use black color as the achromatic color.

Also in the above embodiment, the black correcting means outputs 0 up to a threshold value of one third of the maximum input value. This threshold value may take another value. Although the total output value of C, M, Y, and K is set to a twofold of the input value, this value is not limited but another value may be used.

In the above embodiment, the maximum ink dose is set to 200%. This value is set in accordance with the type of a recording medium, and may take any other value.

If an image is to be printed on a plurality type of recording media, a table for the background color removal/black correcting means is set in accordance with the type of a recording medium.

The printer 300 is not only limited to the above embodiment, but an image may be recorded with a recording head of the type, for example, jetting droplets from a predetermined jet-out opening.

The invention is applicable to a system constituted by a plurality of apparatus (e.g., a host computer, a interface unit, a reader, and a printer) or to a single apparatus (e.g., a copier, a facsimile apparatus).

The scope of the invention includes the case wherein software program codes realizing the functions of the embodiments are supplied to a computer (CPU or MPU) of a system or an apparatus connected to various devices for operating to realize such functions, and the devices are operated in accordance with the program codes.

In this case, the software program codes realize the functions of the embodiments. Therefore, the program codes themselves and means for supplying the program codes to a computer such as a storage medium storing the program codes fall within the scope of the invention.

The storage medium for storing program codes may be a floppy disk, a hard disk, an optical disk, a magneto-optical disk, a CD-ROM, a magnetic tape, a non-volatile memory card, a ROM, or the like.

The functions of the embodiments are realized not only by the program codes supplied to a computer, but also by an operating system or another application software running on a computer supplied with the program codes. Therefore, these program codes obviously fall within the scope of the invention.

The scope of the invention also includes the case wherein the program codes are stored in a memory of a function extension board or unit of a computer, and a CPU or the like of the board or unit performs part or the whole of the actual processes to realize the functions of the embodiments.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing apparatus for performing a color correction process and a color conversion in process, comprising:

color correcting means for inputting color image signals (R, G, B), performing a series of color correction processes, and outputting color image signals (R', G', B');

first equal signal detecting means for detecting whether the constituents of said input color image signals are equal;

second equal signal detecting means for detecting whether the constituent of said output color image signals from said color correcting means are equal;

equal signal generating means for changing the output signals from said color correcting means to generate equal signals;

different signal generating means for changing the output signals from said color correcting means to generate different signals;

first selecting means for selecting the output signals from said different signal generating means if said second equal signal detecting means judges that the output signals from said color correcting means are equal, and if not, selecting the output signals from said color correcting means;

second selecting means for selecting the output signals from said equal signal generating means if the input signals are judged as equal, and if not, selecting the output signals from said first selecting means;

color converting means for inputting the output signals from said second selecting means, performing a series of color conversion processes, and outputting color image signals (C, M, Y, K);

black replacing means for inputting the output signals from said color converting means and replacing the values of the output signals by C=M=Y=0 and K;

third equal signal detecting means for detecting whether the constituents of the output signals from said second selecting means are equal; and third selecting means for selecting the output signals from said black replacing means if the input signals from said second selecting means are judged as equal, and if not, selecting the output signals from said color converting means.

2. A image processing apparatus according to claim 1, wherein said color correcting means includes interpolation calculating means for performing an interpolation calculation with reference to a look-up table storing at each lattice point thereof data subjected in advance to a luminance/density conversion process, a black generating process, a masking process, and a density/luminance conversion process.

3. An image processing method for performing a color correction process and a color conversion process, comprising:

a color correcting step, of inputting color image signals (R, G, B), performing a series of color correction processes, and outputting color image signals (R', G', B');

a first equal signal detecting step, of detecting whether the constituent of the input color image signals are equal;

a second equal signal detecting step, of detecting whether the constituent) of said output color image signals at said color correcting step are equal;

an equal signal generating step, of changing the output signals at said color correcting step to generate equal signals;

a different signal generating step, of changing the output signals at said color correcting step to generate different signals;

a first selecting step, of selecting the output signals in said different signal generating step if it is judged in said second equal signal detecting step that the output signals at said color correcting step are equal, and if not, selecting the output signals at said color correcting step;

a second selecting step, of selecting the output signals at said equal signal generating step if the input signals are judge as equal, and if not, selecting the output signals at said first selecting step;

a color converting step, of inputting the output signals at said second electing step, performing a series of color conversion processes, and outputting color image signals (C, M, Y, K);

a black replacing step, of inputting the output signals, at said color converting step and replacing the values of the output signals by C=M=Y=0 and K;

a third equal signal detecting step, of detecting whether the constituents of the output signals at said second selecting step are equal; and a third selecting step, of selecting the output signals at said black replacing step if the input signals at said second selecting step are judged as equal, and if not, selecting the output signals at said color converting step.

4. A storage medium storing program codes for implementing a computer implementable method of image processing by an image processing apparatus for performing a color correction process and a color conversion process, comprising:

a color correcting step of inputting color image signals (R, G, B), performing a series of color correction processes, and outputting color image signals (R', G', B');

a first equal signal detecting step of detecting whether the constituents of said input color image signals are equal;

a second equal signal detecting step of detecting whether the constituent of said output color image signals at said color correcting step are equal;

an equal signal generating step of changing the output signals at said color correcting step to generate equal signals;

a first selecting step of selecting the output signals at said different signal generating step if said second equal signal detecting step judges that the output signals at said color correcting step are equal, and if not, selecting the output signals at said color correcting step;

a second selecting step of selecting the output signals at equal signal generating step if the input signals are judged as equal, and if not, selecting the output signals at said first selecting step;

a color converting step of inputting the output signals at said second selecting step, performing a series of color conversion processes, and outputting color image signals (C, M, Y, K);

a black replacing step of inputting the output signals at said color converting step and replacing the values of the output signals by C=M=Y=0 and K;

a third equal signal detecting step of detecting whether the constituents of the output signals at said second selecting step are equal; and a third selecting step of selecting the output signals at said black replacing step if the input signals at said second selecting step are judged as equal, and if not, selecting the output signals at said color converting step.

* * * * *

UNITED STATES PATENT AND TRADEMARK OFFICE
CERTIFICATE OF CORRECTION

PATENT NO. : 6,693,731 B1
APPLICATION NO. : 08/689096
DATED : February 17, 2004
INVENTOR(S) : Nobuo Ohnuma et al.

It is certified that error appears in the above-identified patent and that said Letters Patent is hereby corrected as shown below:

COLUMN 4:

Line 47, "$Z_0(Y=C, M, Y)$." should read --$Z_0(Z=C, M, Y)$.--.

COLUMN 5:

Line 46, "ia" should read --is--.

COLUMN 9:

Line 66, "characteristics means 19" should read --"characteristics changing means 19"--.

COLUMN 10:

Line 10, "above" (first occurrence) should be deleted.

COLUMN 11:

Line 58, "in" should be deleted.

COLUMN 12:

Line 35, "A" should read --An--;
    Line 51, "constituent" should read --constituents--; and
    Line 53, "constituent)" should read --constituents--.

COLUMN 13:

Line 3, "judge" should read --judged--; and
    Line 6, "electing" should read --selecting--.

UNITED STATES PATENT AND TRADEMARK OFFICE
CERTIFICATE OF CORRECTION

PATENT NO.        : 6,693,731 B1
APPLICATION NO. : 08/689096
DATED             : February 17, 2004
INVENTOR(S)       : Nobuo Ohnuma et al.

It is certified that error appears in the above-identified patent and that said Letters Patent is hereby corrected as shown below:

<u>COLUMN 14</u>:

Line 2, "constituent" should read --constituents--; and
Line 12, "equal" should read --said equal--.

Signed and Sealed this

Fifth Day of June, 2007

JON W. DUDAS
*Director of the United States Patent and Trademark Office*